July 7, 1936. F. FAUSETT 2,046,450

RADIO TESTING APPARATUS

Filed Feb. 2, 1934 3 Sheets-Sheet 2

Inventor
Floyd Fausett
By
Knight Bros.
Attorneys

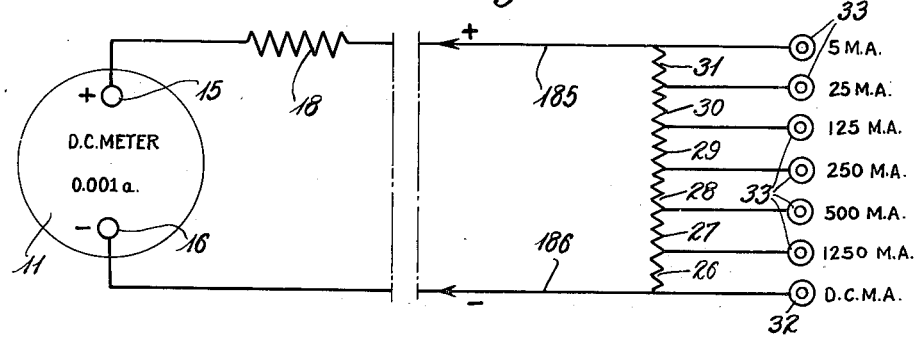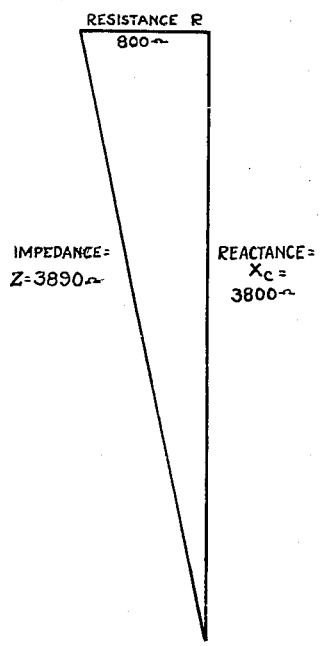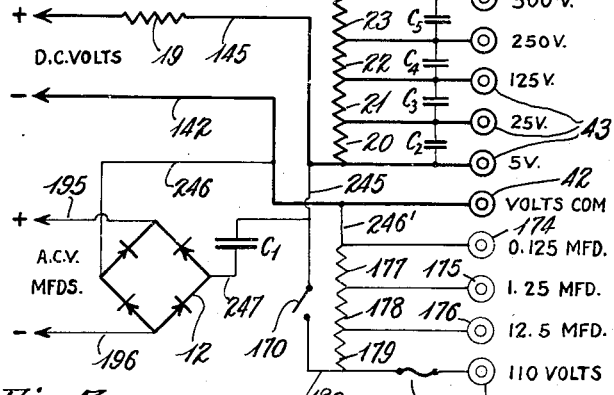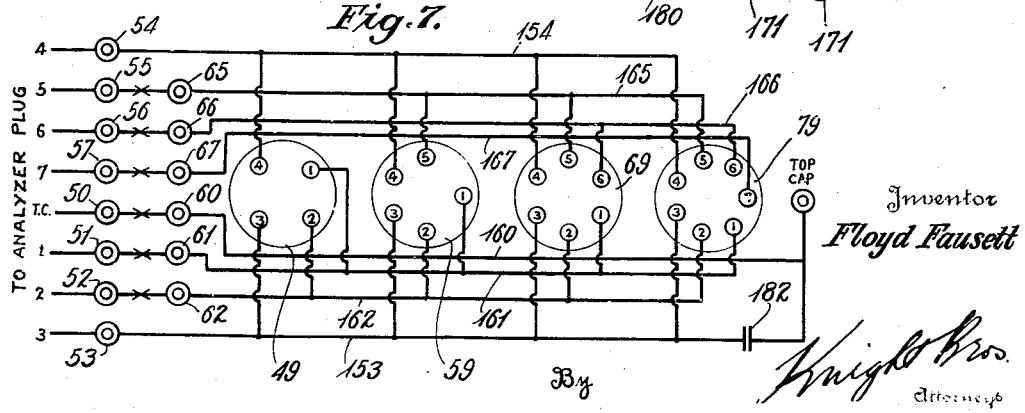

Patented July 7, 1936

2,046,450

UNITED STATES PATENT OFFICE 2,046,450

RADIO TESTING APPARATUS

Floyd Fausett, Greenwood, Miss., assignor to Supreme Instruments Corporation, Greenwood, Miss.

Application February 2, 1934, Serial No. 709,516

17 Claims. (Cl. 250—20)

This invention relates to a portable testing instrument for radio apparatus and more particularly to a tester which incorporates a single indicating meter for measuring all the electric units sought to be determined by apparatus of this type.

It is the object of this invention to provide a measuring instrument having a common scale for readings of both alternating current and direct current units. Provision is made of a single direct current measuring instrument in conjunction with a selector switch so that the former may indicate direct current voltage and current values, alternating current voltages, capacities of condensers in microfarads, and resistance values in ohms. Furthermore, these electrical units may be indicated in several ranges of the instrument; the embodiment described hereinafter covers a total of twenty-five measuring ranges.

It is a further object of my invention to provide for the indication of alternating current values switched into the circuit with the meter by using a full wave rectifier system of the copper-oxide or crystal type in conjunction with a D'Arsonval galvanometer coil. This assembly is so designed that variations in readings, occasioned by inherent changes in the rectifier system, are minimized.

The invention also makes possible the convenient measuring of alternating or direct current components of composite potentials, to the exclusion of each other.

It is a further object of my invention to so arrange the metering instrument in conjunction with a series of tube sockets, pin jacks and a selector switch that a series of measurements normally attendant the testing of a radio receiver or analogous apparatus may be made by a serviceman with the least expenditure of time and effort.

Figure 1:
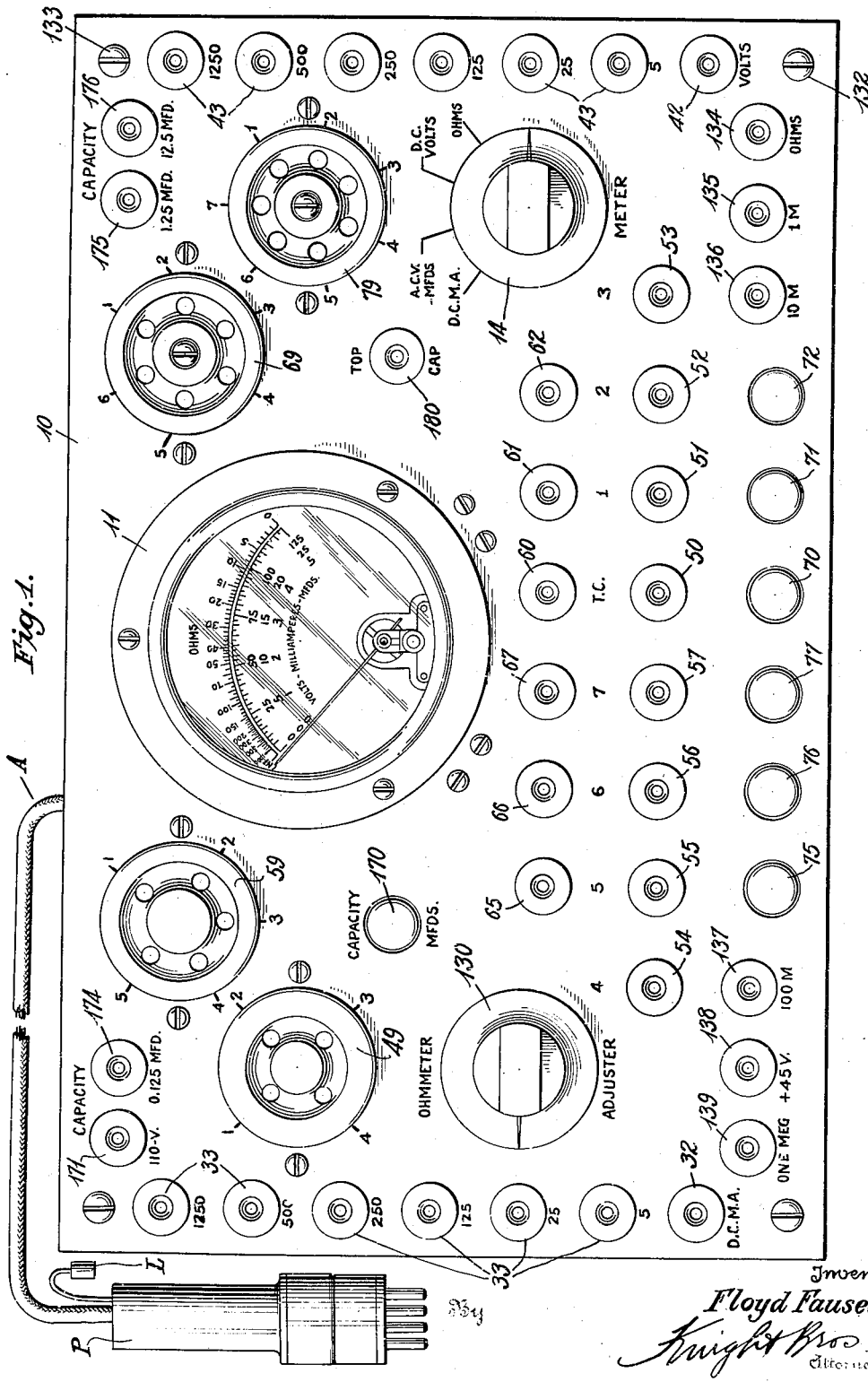
Figure 2:
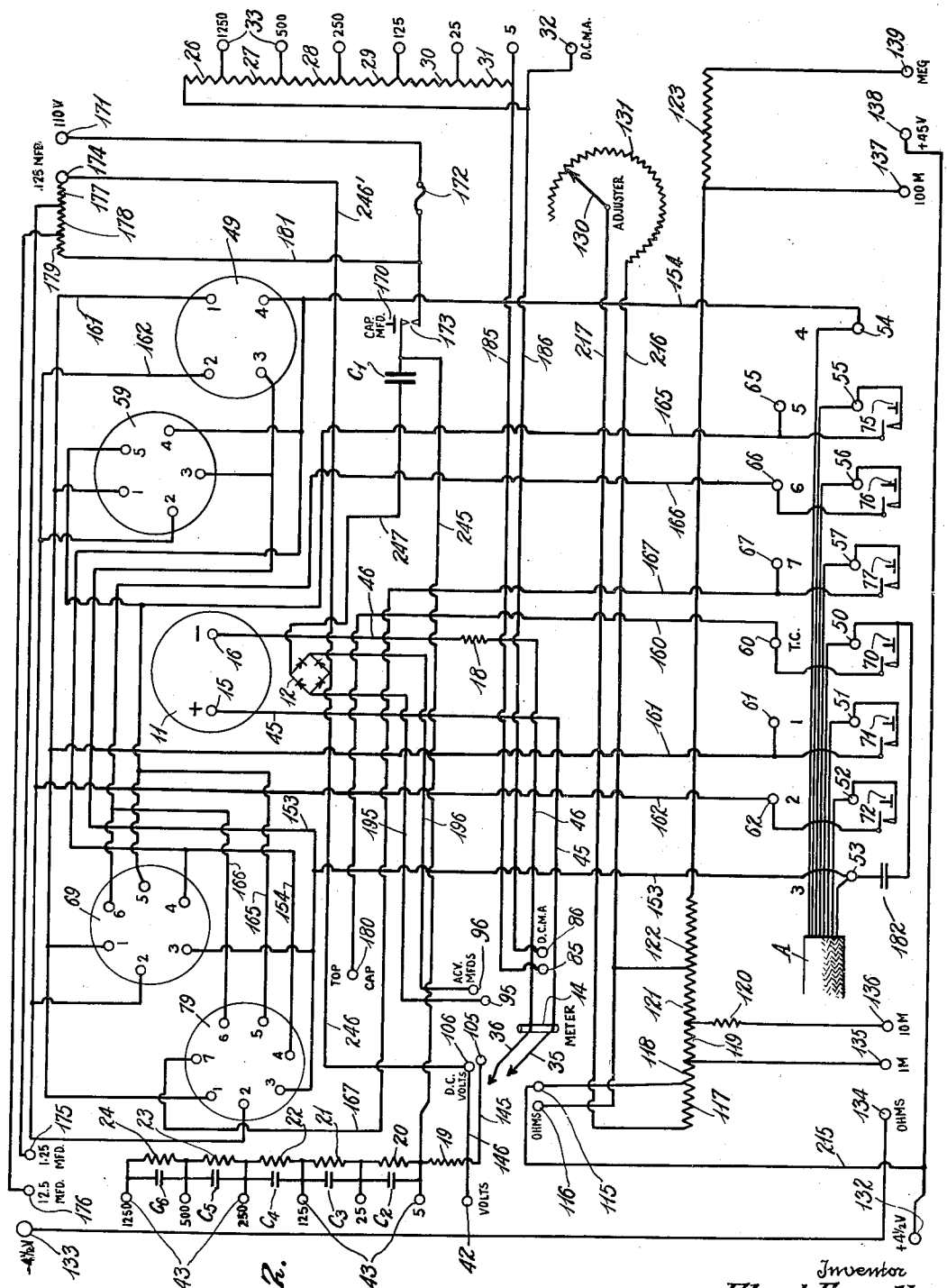

Other objects and purposes will appear from a more detailed description of my invention taken in conjunction with the drawings, in which Fig. 1 is a plan view of the panel of the testing apparatus, Fig. 2 is a circuit diagram thereof showing the elements upon the reverse side of the panel, Fig. 3 is a simplified showing of the metering arrangement for measuring direct current values, Fig. 4 is a simplified circuit diagram showing the connections for determining resistance values, Fig. 5 is a simplified diagram showing the arrangement whereby direct current and alternating current voltages may be read upon a single scale upon the meter, and furthermore whereby capacities may be determined, Fig. 6 is a vector diagram of the metering circuit when alternating current voltages are measured, and Fig. 7 is a simplified showing of the connections between the sockets shown in Fig. 2 and the pin jacks provided on the panel with the switches associated with several of them.

The single indicating instrument is calibrated to function as a multi-range direct current milliammeter, a multi-range ohmmeter, a multi-range direct current voltmeter, a multi-range alternating current voltmeter, and a direct reading capacity meter. The meter, consisting of a D'Arsonval galvanometer movement having a full scale sensitivity of one milliampere (0.001 amp.) and adjusted for an effective internal resistance value of 300 ohms, is selectively switched into the desired measuring circuits by the operation of a 2-gang 4-position rotary switch.

Multi-range meters for measuring direct current voltages and currents are old. Furthermore, a meter for measuring alternating current units and direct current units with a common uniformly calibrated scale is also known. The latter arrangement involves the use of a rectifying system for rectifying the alternating current energy before it is measured by a D'Arsonval movement with which the rectifying system is connected. The provision of a rectifier results in readings which vary under several conditions, since it is an inherent characteristic of such rectifiers to change in resistance with changes in current density, temperature, frequency, and age. The instant invention minimizes these variations as explained hereinafter.

Alternating current values, when measured by conventional alternating current instruments, are not indicated as having the same values when rectified and measured with a D'Arsonval galvanometer movement. This is so because the former type of instruments measures root mean square or effective values of the alternating current energy, whereas the D'Arsonval galvanometer indicates the average values. In the case of direct currents, the average and the effective values are the same. In the case of alternating currents, the average value bears a relationship of 1 to 1.11 to the root mean square or effective value. Thus, if an alternating current potential of 100 volts, as measured by an alternating current voltmeter, is applied to a rectifier and subsequently indicated upon a direct current instrument, the same reads 90 volts. For that reason, the average value of 90 volts must be multiplied by 1.11 in order to obtain the correct alternating current reading. The form factor of 1.11 is calculated for sine waves, which wave form is approximated in commercial practice.

Although resistance means have been utilized previously for adjusting the sensitivity of the direct current meter to differentiate between alternating current and direct current energy, the instant invention contemplates the use of capacitive reactance to effect the necessary adjustment with many attendant advantages. The instant invention contemplates the use of one or more condensers which have the effect of proportioning to the proper degree the total impedance of the circuits for measuring alternating current values compared to those employed for measuring direct current values, so that more current is permitted to pass through the D'Arsonval coil in the first case than in the latter case. The form factor 1.11 may be modified by a suitable selection of the condensers in order to adapt the metering arrangement to varying conditions.

In a universal tester of this type embodying a single meter, consideration must be given to the current density characteristic of the rectifier which is associated with the meter. This characteristic manifests itself in the form of an increase in rectifier resistance corresponding to a decrease in the electrical load. No two instrument rectifiers have exactly the same current density characteristics, but the average resistance may be assumed to amount to 500 ohms with a load of 1 milliampere. With a load of half this amount, the resistance of the rectifier may increase as much as 50%. This accounts for the irregularities in the amount of deflection in instruments of this type. The current density characteristic may be better understood by a tabulation of resistance values corresponding to current values, based on a typical rectifier unit which has an internal resistance value of 500 ohms, with a load of 1 milliampere, as follows:

| Milliamperes | Ohms |
| --- | --- |
| 1.0 | 500 |
| 0.9 | 530 |
| 0.8 | 560 |
| 0.7 | 620 |
| 0.6 | 685 |
| 0.5 | 760 |
| 0.4 | 870 |
| 0.3 | 1030 |
| 0.2 | 1300 |
| 0.1 | 2000 |

The effect of the current density characteristics is reduced, however, by the usual multiplier resistors as used in alternating current voltmeters of the rectifier type. For example, assuming that a rectifier having the above-tabulated resistance values is used with a multiplier resistor for a 5-volt measuring range with a meter such as that described herein, a total circuit resistance of 4500 ohms would be required, this value being obtained by dividing 5000 by the form factor of 1.11. At half-scale meter needle deflection, the total resistance of the circuit increases 260 ohms, as indicated in the above table, so that the increase in the total resistance of the circuit is about 5.8%, as contrasted with an increase of about 52% if the meter were used without a multiplier resistor for measuring a current value corresponding to half-scale deflection. The effect is still further reduced when the range of the meter is extended to 25 volts, with a multiplier resistor added for increasing the total resistance to a value of 22,250 ohms. In this case, the effect upon the total resistance is obtained by dividing 260 ohms, which is the increase in resistance at half-scale deflection, by 22,250 ohms, an increase of 1.15%.

In accordance with the instant invention, the effect of the current density characteristic of the instrument rectifier is further minimized by using a series capacitor for the low range as a multiplier reactance, instead of utilizing a multiplier resistor. This arrangement forms an impedance circuit wherein the capacitive reactance is about 90 degrees out of phase with the meter and rectifier resistance, so that the impedance elements may be represented by a right-angled triangle in which the resistance of the circuit is represented by a short leg of the triangle and the capacitive reactance by a long leg. The resulting impedance is, of course, represented by the hypotenuse of the triangle. This condition is graphically represented in Figure 6, in which the resistance is shown as a value of 800 ohms, obtained by adding the resistance of the meter to the resistance of two legs of the rectifier unit with a full-scale deflection load of one milliampere. The capacitive reactance is shown as having a value of 3800 ohms, which is the reactance of a 0.7 mfd. capacitor for a frequency of 60 cycles per second. The resulting impedance is 3890 ohms, as determined by the solution of the impedance formula $$Z=\sqrt{R^2+X_c^2}$$

The above values are characteristic of a typically constructed analyzer so that the form factor of the rectifier unit is about 1.29 in this case, determined by dividing 5,000 by 3890.

As may be seen in Fig. 6, slight variations in the length of that side of the triangle which represents the resistance have comparatively little effect on the length of the hypotenuse, whereas the variations of the rectifier resistance would be considerable if the elements of the circuit impedance were additive algebraically rather than vectorially, that is, if these variations were capable of being represented by a straight line instead of by a triangle such as that described. It was shown above that the increase in the total resistance of a 5-volt circuit at half-scale deflection, by reason of the current density characteristic, when a 4500-ohm multiplier resistor is employed, amounted to 5.8% of the total resistance. With the arrangement according to the instant invention, an increase of 260 ohms of the resistance leg of the triangle increases the length of the hypotenuse only 50 ohms, so that the increase in the impedance amounts to less than $$\frac{50}{3890}$$

or 1.3% as compared to an increase of 5.8% when a multiplier capacitor is not used. In other words, by using a capacitor as a multiplier reactor instead of using a multiplier resistor for the low range of the alternating current measuring functions of the meter, the voltage indications are made to conform very closely to a uniform scale distribution for practically all measuring requirements, as the variations in the resistance of the rectifier unit are made to have comparatively little effect in the circuit in which the impedance is composed mostly of capacitive reactance.

Of lesser importance is the effect of ambient temperature variations on the internal resistance of instrument rectifiers, in which decreasing temperatures cause increasing resistance values. The reactance element of the arrangement according to the invention reduces these errors to negligible proportions by the same principles which operate to reduce the effect of the current density characteristic.

Likewise, any variations in the resistance of the rectifier, measured by the aging thereof, or by changing of the frequency of the alternating current imposed thereon, exercise a minimum effect upon the reading which is obtained.

The adjustment of the 5-volt alternating current range of the tester is accomplished by inserting a condenser $C_1$ of suitable capacity in series with the rectifier 12 and meter 11 so that the meter needle assumes the full-scale position with an applied alternating current potential of 5 volts. Subsequent to the adjustment of the 5-volt range for alternating current potentials, the higher ranges are similarly adjusted by inserting condensers $C_2$—$C_6$ of suitable capacity across the several multiplying resistors, which serve to by-pass more current through the meter when measuring alternating current values than when the same terminals are used for measuring direct current values. The exact adjustment of the alternating current measuring circuits may be made as well by means of one or more variable resistors in series with the condensers, instead of by adjusting exactly the condenser values. The vectorial representations for the higher indicating ranges of the meter are additional triangles, as shown in Fig. 6, appended to the one shown in this figure, in which the resulting impedance suitably affects the passage of current through the rectifier and measuring instrument. These capacities are given in the table following hereinafter.

The means employed for obtaining a uniform scale distribution for alternating current indications as described above are found to be accurate within 5% of full-scale values which is generally accepted as being sufficient for all practical purposes, since practically all measurements required in radio servicing involve direct current potential values. As a matter of fact, alternating current power supply potentials usually have a permissible variation of 10% and this variation is reflected in the alternating current filament potential values by the same ratio. Most radio "power pack" rectifier circuits are of the full-wave type, and the alternating current plate potentials can be compared with each other for the purpose of determining whether or not an unbalanced transformer winding exists without the necessity of an accurate measurement of these potentials. Output measurements may be arbitrarily adjusted in practice for maximum indications, and accurate measurements in electrical terms are not always required. Practically all other measurements involve direct current values in the measurement of which the crystalline rectifier unit of the tester is not employed.

In view of the fact that the reactance of a capacitor is a function of the frequency of the alternating current energy applied thereto, it is necessary that the condensers be calibrated for a predetermined frequency which is likely to be encountered by the serviceman. Thus the condensers shown in the drawings, in Figs. 2 and 5, have the following values corresponding to the most universal commercial frequencies:

| Frequency in cycles per second | Capacity in Mfds. | | | | | |
| --- | --- | --- | --- | --- | --- | --- |
|  | $C_1$ | $C_2$ | $C_3$ | $C_4$ | $C_5$ | $C_6$ |
| 60 | 0.7 | 0.08 | 0.015 | 0.015 | 0.006 | 0.002 |
| 50 | 0.84 | 0.096 | 0.018 | 0.018 | 0.0072 | 0.0024 |
| 42 | 1.0 | 0.114 | 0.021 | 0.021 | 0.0086 | 0.0029 |
| 30 | 1.4 | 0.16 | 0.03 | 0.03 | 0.012 | 0.004 |
| 25 | 1.68 | 0.192 | 0.036 | 0.036 | 0.0144 | 0.0048 |

The variations in frequency normally encountered in commercial practice do not materially affect the accuracy of the instrument for the reason that these variations are small. The practicability of synchronous electric clocks which depend for their operation upon the maintenance of a substantially constant frequency is an established fact.

A simplified diagram of the arrangement for effecting an adjustment of the sensitivity between the reading of alternating current and direct current voltages is shown in Fig. 5. Herein, when direct current voltages are applied to the tester within a range of 5 volts, the meter having an effective internal resistance of 300 ohms is connected in series with a resistance of 4700 ohms to obtain a maximum deflection at 5 volts, representing a 1,000 ohms per volt sensitivity. At higher ranges of applied voltages, the multiplier resistances are inserted in series to the several pin jacks, in which case the instrument may be connected for a maximum deflection for any desired range. These resistances have the following values in order to carry through the 1,000 ohms per volt relationship. A resistance of 20,000 ohms is added for the 25 volt terminal, 100,000 ohms for the 125 volt terminal, 125,000 ohms for the 250 volt terminal, 250,000 ohms for the 500 volts terminal, and 750,000 ohms for the 1250 volt terminal. The condenser $C_1$ serves to block the direct current potentials from the rectifier. The meter does not register alternating current values when the switch 14 is set for direct current measurements because the rectifier unit is not in the metering circuit. Thereby it is possible to measure direct current components of composite potentials to the exclusion of alternating current components. When the switch 14 is set for alternating measurements, the components of the latter in composite potentials are measured to the exclusion of direct current components on account of the blocking condenser 12. The relation of the reactance of the condenser $C_1$ of 0.7 mfd. capacity in the rectifier circuit was explained above. In the example chosen, this reactance amounts to 3800 ohms, giving the desired full-scale deflection upon the meter when an alternating current voltage bearing an effective value of 5 volts is connected between the common and 5 volt terminals. The condensers $C_2$—$C_6$ shunting the multiplier resistors affect the combined impedance of these elements in a diminishing sense to that effective alternating current values may be properly indicated on the same scale as the direct current values.

The invention also enables a convenient measurement of the capacities of condensers in three different ranges upon a uniform scale of the meter. For this purpose an ordinary 110-volt power supply, in series with the condenser of unknown value, is connected in the circuit of the rectifier and its associated condenser together with a proper value of shunting resistance. A fuse is provided for protecting the meter and shunts against such overloads as might be occasioned by an inadvertent attempt to measure the capacity of a short-circuited condenser.

A self-contained 4½ volt battery in the tester cabinet makes possible the measurement of resistance values for several ranges. These ranges of 1,000, 10,000, and 100,000 ohms may be read upon the same ohms scale upon the multiplication of the proper decimal factor. A variable shunt resistor is provided for adjusting the ohmmeter circuit for an accurate reading of the "zero-ohms" value. A 45-volt source of potential may be connected to the tester to obtain a megohm range of the meter.

The above design features are incorporated in a handy and compact portable tester, the panel of which is illustrated in Fig. 1, and the circuit diagram of which is shown in Fig. 2.

The multiple functions of the meter 11 are controlled by the setting of the 4-position, 2-gang rotary switch 14 having two arms 35 and 36 connected to the positive and negative terminals 15 and 16 of the meter by conductors 45 and 46, respectively. These arms 35 and 36 may be set at the D. C. M. A. position to have the meter function as a direct current milliammeter, at the A. C. V.—Mfds. position for the meter to function as an alternating curent voltmeter and a capacity meter, at the D. C. volts position to have the meter function as a direct current voltmeter, and at the ohms position to have the meter function as an ohmmeter. Various ranges of the meter operating as a direct current or alternating current voltmeter may be selected by a series of pin jacks 43 on the right side of the panel cooperating with a common pin jack 42. The meter may be employed for ranges of 5, 25, 125, 250, 500, and 1250 volts. The values of the multiplier resistors 20—24 to obtain these ranges at a sensitivity of 1,000 ohms per volt are given above. Several ranges of the instrument operating as a milliammeter may be selected by one of a series of pin jacks 33 at the left side of the panel co-operating with the common terminal pin jack 32. The shunt resistors 26—31, to obtain the operating ranges of the ammeter at 1250, 500, 250, 125, 25, and 5 milliamperes, have the following values. Resistor 26 has a value of 0.3 ohms; 27, 0.45 ohms; 28, 0.75 ohms; 29, 1.5 ohms; 30, 12 ohms; and 31, 60 ohms. These shunts co-operate with the resistance of the metering circuit which is adjusted to exactly 300 ohms by the insertion of a resistor 18 having a value equal to the difference between the resistance of the meter and 300 ohms. Several ranges of capacity may be measured by the meter by suitably employing a common terminal 171 at the top of the panel in selective co-operation with pin jacks 174, 175, and 176. The measuring circuit for capacity readings is controlled by the depression of a push button switch 170. A self-contained battery within the tester cabinet has the opposite terminals thereof connected to screws 132 and 133 on the right side of the panel, these screws serving to maintain the panel within the cabinet. The several ranges of the instrument operating as an ohmmeter are obtained by the co-operation of the common terminal pin jack 134 with terminals 135, 136, 137, 138 and 139, as explained hereinafter. A variable resistance 131 is controlled by the ohmmeter adjuster 130 to make suitable compensation for the varying potential of the battery.

For the purpose of presenting the potentials present in a radio set to the tester, an analyzing plug P, adapted to co-operate with proper adapters, is connected at the end of the cable A leading from the tester. The terminals of the plug or adapter, connected with a series of conductors in the cable, bring the potentials of the receiver into the tester at the pin jacks 50 to 57. The cable conductors terminate at the pin jacks, which are labeled on the panel from left to right (Fig. 1) 4, 5, 6, 7, T. C., 1, 2, and 3. This numerical designation corresponds to the standard practice recently adopted for numerically designating the tube and socket terminals. Numeral 1 signifies the grid terminal nearest the conventional plate terminal which is designated 2. Numerals 3 and 4 designate the filament or heater terminals on all types of tubes regardless of the number of terminals. The conventional cathode terminal is represented by numeral 5. The terminals numbered 6 and 7 are applicable to tubes which have more than five base terminals. The conventional control grid terminal is designated as the "Top cap" and abbreviated T. C. and is so designated on the panel. The T. C. pin jack 50 on the panel is connected directly through the analyzing cable A to the lug L which terminates the short flexible insulated conductor at the top of the analyzing plug P. It is preferable to have this lug L connected through a flexible lead so that connections may be made more conveniently, which at times is difficult when the lug is rigidly attached to the analyzing plug. Jumpers or wire connections extend between pin jacks 50, 51, 52, 55, 56, and 57 and pin jacks 60, 61, 62, 65, 66 and 67, each of which may be broken by depressing its corresponding push button switch 70, 71, 72, 75, 76, and 77.

Four sockets, 49, 59, 69, and 79 are provided on the analyzer panel for accommodating tubes having four, five, six or seven prong elements in the base. The sockets have their receptacles numbered in accordance with the standard designation explained above. A pin jack 180 is provided on the analyzer panel into which one end of a suitable conductor may be inserted, the opposite end having a proper clip for engaging the "Top cap" of a tube inserted in any one of the tube sockets on the analyzer panel. The "Top cap" pin jack is connected to the pin jack 60 by conductor 160. Likewise conductors 161, 162, 165, 166 and 167 extend from pin jacks 61, 62, 65, 66, and 67 to the terminals of the sockets 49, 59, 69, and 79, designated 1, 2, 5, 6, and 7, or to as many of those terminals as the sockets have. Conductors 153 and 154 extend from pin jacks 53 and 54 directly to the 3 and 4 terminals of the several tube sockets. In view of the fact that these terminals invariably carry the heater or filament current, no switching means is provided for breaking the circuit of these conductors, since the potential across them is the only reading that is desired. The arrangement of the pin jacks associated with the conductors of the analyzing cable, in conjunction with the particular switching means and the several pin jacks associated with the meter, make possible a highly flexible system of testing operations. Some of these operations are outlined below.

*Measurement of plate current*

In view of the fact that the plate current of a tube is the result of practically all of the electrical factors involved in the circuits leading to the tube, a normal plate current value is fairly conclusive evidence that the circuits leading to the tube are performing their normal functions. It is, therefore, usually sufficient, in the preliminary analysis of a radio receiver, to measure only the plate current of each tube, in turn, until a tube is encountered in which the plate current is incorrect, when other readings for that tube may be taken in an effort to isolate the defect in the circuit leading to the tube in which the incorrect plate current reading is observed. In order to measure plate currents with the tester disclosed herein, the tester panel is cleared and the radio receiver which is being tested is connected for normal operation. While the radio is de-energized, the tube from the stage of the receiver under test is removed and is placed in one of the sockets, 49, 59, 69 or 79 in the analyzer panel, depending upon the number of base terminals in the tube. The analyzing plug P, with its proper co-operating adapter, is inserted in the emptied socket in the radio receiver. If the displaced tube is one having a "Top cap", the proper connections are made in the radio receiver to the lug L and on the analyzer panel to the "Top cap" pin jack 189. The radio receiver is then turned "on" for normal operation. Switch 14 is set to the D. C. M. A. position, and a test probe conductor is connected between the pin jack 32 and the pin jack 62. Another test probe conductor is connected between pin jack 52 and the pin jack 33 for the 250 milliampere range. The plate current is observed upon the momentary depression of push button 72.

In the above test, the instrument 11, operating as a direct current milliammeter, is inserted in the cable conducting the plate current between terminals 52 and 62. The jumper between these two terminals normally carries the plate current and the depression of switch 72 breaks the normal circuit and allows the circuit containing the meter to conduct the plate current between terminals 52 and 62 to measure the same. It is usually advisable to first observe the plate current readings on the 250-milliampere range, after which the connector may be shifted to a suitable lower range. The metering circuit in its simplified form is shown in Fig. 3. The above procedure may be continued, without changing the connections, from tube to tube until the plate current measurements have been made for all of the tubes in the radio; or until a tube is encountered in which there is an indication of an incorrect plate current value, in which case the operator should undertake a more detailed analysis in an effort to isolate the cause of the incorrect plate current condition by potential and resistance measurements as outlined hereinafter.

Tube testing

When a radio receiver is in proper operating condition, the use of an analyzer for testing the tubes in the radio tube sockets provides a method of testing tubes which is unexcelled by any tube tester for practical purposes in the detection of weak or noisy tubes. This preliminary test of a tube is performed by placing the tube in the analyzer socket and tapping or thumping it while it is held away from the radio receiver. Thereby, any rattling or rasping noises occasioned by the tapping action which characterizes a faulty tube may be definitely attributed to the tube rather than to the noises occasioned by some loose part in the radio chassis. It is of course understood that the analyzer P is utilized to bring the potentials from the radio receiver socket to the tube under test on the analyzer panel.

Tube test readings of amplifier tubes are obtainable as a logical step following the measuring of plate current, as described above, by the connection of the self-contained 4½ volt battery B in the tester to the pair of pin jack terminals which corresponds to the input grid of the tube under test. In the types 26 and 27 tubes, in which the "I" terminal corresponds to the input grid as explained above, the following testing procedure is carried out: The normal plate current is first observed by the depression of push button switch 72. A flexible connector is extended from pin jack 134 to 51. Another connector is extended from the pin jack 136 to 61. These connections serve to place the positive terminal of the battery B nearer to the grid upon the depression of push button switch 71 so that, upon the simultaneous depression of switch 72, a change in the reading of plate current is noted in an increasing sense. It is possible for the connections to be reversed so that the negative terminal of the battery is placed nearer the grid and, at the simultaneous depression of switches 71 and 72, a decrease of plate current is noted.

In the types 24 and 25 tubes, the input grid is connected to the "Top cap" terminal, and the battery is connected to "T. C." pin jacks 50 and 60 instead of to the "I" pin jacks 51 and 61. The tube test is then obtained by depressing push button switches 70 and 72. Finally, the terminals 6 and 7 may represent the input grids of any other types of tubes, reliance being had upon radio service notes for this information in order to perform the desired tests. The multiplier and shunt resistors of the ohmmeter prevent the short circuiting of the battery before the depression of the corresponding input grid push button switch. The amount of increase or decrease in the plate current indicates the extent to which the input controls the plate current output, which in turn corresponds to the amplifying ability of the tube. After a certain amount of experience the operator is capable of judging the fitness of the tubes, as is evidenced by the above test.

Another method of testing tubes in a radio receiver is provided by the measurement of the output of the receiver, as explained hereinafter. The replacement of faulty tubes effects an increase in the output energy of the receiver.

Potential measurements

After proceeding with the preliminary steps of plate current measurements and tube testing until a tube socket is encountered in which the tube is passing incorrect plate current, and in which the replacement of the tube does not correct this condition, it is necessary to resort to more specific tests for the purpose of isolating the circuit which is defective. To do this, the analyzer panel is cleared and the switch 14 is set at its D. C. volts position. A test probe conductor is connected between the pin jack 42 and one of the pin jacks corresponding to the cathode terminal of the tube circuit. In the case of tubes having indirectly heated cathodes, the cathode terminal 5 is connected with pin jack 55 or 65. In the case of filamentary cathodes, the connection of the test probe connector is made to either pin jack 53 or 54. Another test probe connector is connected to one of the pin jacks 43, depending upon the range desired, and the free end thereof is selectively applied to the pin jacks 50 to 57 in order to measure the potentials applied to the tube with respect to the cathode terminal. The metering circuit in its simplified form is shown in Fig. 5. Upon the finding of a defective circuit by comparison of the potential readings noted with those published by the manufacturers of the radio receiver, the ohmmeter is utilized for locating the defective part, as explained hereinafter. After the potentials are noted, it is advisable to discharge the condenser $C_1$ through the multiplier resistors by momentarily touching the free contact ends of the test lead conductors together before disconnecting the other ends of the leads from the pin jacks 42 and 43.

Although the connections described above are for the purpose of measuring the potentials between the electron-emitting terminal and the other terminals of the tube, it is possible to quickly determine the potentials existing between other terminals by using any terminal other than the cathode or filament as the reference point. The design of the tester disclosed herein with the arrangements of the pin jacks thereon results in what has been termed a "free reference point system" which facilitates current, potential, and resistance analyses as well as tube testing. Thus, any one of the terminals 50 to 57 may be connected to the common voltmeter terminal 42 and the potentials therebetween and the remaining tube terminals quickly determined by plugging connectors between the corresponding pin jacks and the terminals appurtenant the desired range of the meter. The radio chassis, the cathode, the filament, or any element of a tube circuit regardless of the terminal arrangement of the tube may be used as the reference point for potential and resistance tests.

The principles of the "free reference point system" of analysis through an analyzing cable may be compared to the principles of the modern telephone switchboard through which any subscriber may be connected with any other subscriber, and which is easily adaptable to changes in the list of subscribers. In this analogy, the tube terminals correspond to the subscribers. The tester according to the instant invention is, fundamentally, a miniature switchboard with an analyzing plug and cable for extending all of the circuits of a radio tube socket to conveniently located pin jack terminals to which any range of the meter may be applied for any desired current, potential or resistance measurement. This arrangement provides access to practically every circuit in a radio, without dismantling the radio chassis. This design furthermore renders the tester particularly adaptable to new testing procedures and precludes possibilities of obsolescence.

In the course of taking potential measurements for filament circuits supplied by alternating current, the switch 14 is set to the A. C. V.—Mfds. position. A test probe conductor is connected between the pin jacks 42 and 53 and another one between one of the pin jacks 43 of suitable range and pin jack 54. The alternating current voltage is read upon the common scale of the meter for which compensation has been made, as explained above.

*Resistance analyses*

For general radio analyses, it is recommended that the plate current indications be relied upon as having primary importance, because correct plate current values almost invariably indicate correct potentials applied to the tube sockets. Whenever a socket is encountered during a general analysis in which the plate current fluctuates or is radically low or high, it is then advisable to concentrate the investigation at that socket in an effort to determine the cause of the radical plate current. This investigation may lead to the use of the ohmmeter functions of the analyzer for point-to-point tests of the component elements of the circuits of the socket. Before undertaking such tests, the radio must be disconnected from the power supply outlet. The resistance analyses may be made between the pin jack terminals of the analyzer cable circuits, or from these terminals to the chassis or other reference points, without removing the analyzing plug from the socket in which the circuit defect apparently exists. Resistance analyses should not be made in lieu of the usual current and potential anaylses because some types of resistors change in resistance values when operating under their normal loads. Furthermore, it is generally advisable to disconnect resistors from parallel circuits in order to test them, whereas current and potential values can be analyzed without disturbing normally permament connections.

The instrument 11 is connected for its function as an ohmmeter as shown in Fig. 4 by the setting of the switch 14 to the "Ohms" position. A test connector is inserted in the common pin jack 134 and another one is inserted in one of the pin jacks 135, 136 or 137, depending upon the range of the ohmic measurements desired. The latter three pin jacks correspond to ranges of 1,000, 10,000, and 100,000 ohms respectively. Before connecting the resistance of unknown value between the ends of the connectors to obtain the resistance reading on the meter, these ends are contacted corresponding to zero ohms and the knob 130 of the rheostat 131 is turned until that value is indicated on the meter, by a maximum deflection of the needle.

In order to read resistance values up to 1 megohm, provision is made for the connection of a 45-volt source of potential in the measuring circuit. The positive terminal of a 45-volt battery is connected to pin jack 138 and one end of a test lead conductor is connected to the negative terminal thereof. Another test lead conductor is connected to the pin jack 139. The ohmmeter circuit is adjusted for zero ohms by contacting the free ends of the test lead conductors and rotating the ohmmeter rheostat 130 to obtain maximum deflection of the meter. The value of an unknown resistor connected between the free ends of the conductor will be indicated on the "Ohms" scale of the meter by multiplying the reading by 1,000.

The resistors associated with the ohmmeter circuit have the following values. Resistor 131 is adjustable between the limits of 0 and 3600 ohms. Resistor 117 has a value of 600 ohms; 118, 33 ohms; 119, 297 ohms; 128, 51 ohms; 12, 2723 ohms; 122, 3269 ohms; and 123, 31500 ohms.

The resistance values of circuit portions may be determined by the ohmmeter upon the proper connections of the ohmmeter terminals between the several circuit elements.

*Capacitor leakage tests*

While the higher ranges of the ohmmeter may be used for measuring the leakage resistance of paper capacitors, the leakages which can be detected in this manner are so far in excess of the permissible leakages for paper capacitors that the use of higher potentials is recommended for such leakage tests. The Radio Manufacturers Association recommends that the insulation resistance of fixed paper capacitors should not be less than 500 megohm microfarads, at a capacitor temperature of 68° F., the test being made by applying a direct current potential of 250 volts to a completely discharged capacitor and maintaining this potential for three minutes before the insulation resistance is measured. These conditions can generally be sufficiently approximated in practical service procedure by employing a 250-volt direct current potential in series with the 250-volt direct current range of the meter 11. When a testing device for supplying a 250-volt direct current potential is not available, the plate potential of the output tube of a radio receiver may be utilized by making the following connections. The analyzing plug P is inserted in place of one of the power output tubes in the receiver and the displaced tube is mounted in the proper socket in the analyzer. The switch 14 is set at its direct current "Volts" position. A conductor is connected between pin jack 42 and the pin jack corresponding to the cathode, which is 53 in the case of a 4-pin type of tube or 55 if the tube is of the 5-pin type. One end of another conductor is connected to the 250-range pin jack 43, the other end of which is designed to be applied to the capacitor. One end of another conductor is connected to the plate terminal of the power tube at either pin jack 52 or 62, and its other end is free for application to the capacitor. A direct current potential of approximately 250 volts now exists between the free ends of the conductors and, upon application thereof to the capacitor, an indication of its condition is obtained. A good capacitor takes a charge through the meter which will be indicated by a maximum reading at the instant the connection is made, with the reading decreasing to zero as the charge is completed. The instantaneous maximum reading varies with the capacities of the condensers under test. A condenser with a resistance leakage is indicated by the failure of the meter needle to complete its traverse to the zero position. The failure of the meter to indicate any response to the charging potential indicates an "open" condenser or a condenser of a capacity too low to accommodate a discernible charge with the applied potential. A short-circuited condenser is indicated by a reading on the meter of the full voltage of the direct current power supply.

*Capacity measurements*

Because of the possibility of blowing the 1-ampere fuse 172, located beneath the analyzer panel, when attempting to measure the capacity of a short-circuited condenser, it is recommended that every condenser be subjected to the leakage test outlined in the preceding paragraph before undertaking a measurement of the capacity. Having a 110-volt 60-cycle power supply available, capacity readings are obtained by making the following connections. One side of the power supply system is connected to the pin jack 171. The other side of the power supply system is connected to one side of the condenser under test. The other side of the condenser is connected by means of a conductor to the 12.5 mfd. pin jack 176. A reading of the capacity is obtained on the 125 scale of the meter upon the depression of the capacity switch 170 (Figs. 1, 2, and 5) and the closing of contacts 173. If the meter reading is less than 12.5 on the 125 scale of the meter, the condenser connection is shifted to pin jack 175. If the meter still reads less than 12.5 on the 125 scale, the connection from the condenser is shifted to the 0.125 mfd. terminal 174. When pin jack 176 is availed of, the reading of the 125 scale of the meter should be divided by 10 to obtain the proper mfd. indication; when the pin jack 175 is used, the reading should be divided by 100; and, when using the pin jack 174, the reading should be divided by 1,000. Resistances 177, 178, and 179 are designed for a definite frequency and, when the alternating current power supply has a frequency other than 60 cycles, these resistances are modified accordingly. These variations in the resistances for different frequencies are tabulated in the table below.

| Frequency in cycles per second | Resistance in ohms | | |
|---|---|---|---|
| | Resistor 179 | Resistor 178 | Resistor 177 |
| 60 | 11 | 98 | 960 |
| 50 | 13.2 | 118 | 1152 |
| 42 | 15.7 | 140 | 1371 |
| 30 | 22 | 196 | 1920 |
| 25 | 26.4 | 235 | 2304 |

*Output measurements*

The six alternating current voltage measuring ranges are ideally suitable for output measurements. The blocking capacitor $C_1$ isolates the output signals from the plate potentials applied to the power tubes. The desired range of the voltmeter may be connected between the power tube plate terminal and the cathode or filament of the tube or the chassis of the radio without the use of output adapters. Also, the meter may be connected across the voice coil terminals for output measurements during the usual radio readjustment operations. The output measurements are taken by inserting the analyzing plug P in the place of the power output tube and placing the tube in the proper socket on the analyzer panel. The switch 14 is set to its A. C. V.—Mfds. position. The common volt terminal 42 is connected to one of the pin jacks 53 or 55, depending upon the type of cathode in the power tube. A test lead is connected from the pin jack 43 of the proper range, for instance 250, to one of the plate pin jacks, such as 52. The meter now indicates the output of signals impressed upon the radio receiver and the latter should be adjusted for maximum deflection. By the use of an oscillator for testing purposes, the output of which is modulated by the frequency of the power source, the output readings constitute actual potential readings in volts. Although these output readings are generally noted for the maximum values, it has been found advantageous to note the actual readings of various receivers for use as comparisons and references in future adjustments. The output measurements of a radio receiver having the energy of a 60-cycle, 100% modulated oscillator imposed thereon, provide an ideal method for testing tubes. The tubes are tested by observing the effect on the output meter readings resulting from the replacement of questionable tubes with new tubes. Tubes tested in this manner are usually designated as "set tested" tubes. This method of testing is also ideal for detecting fading conditions within the receiver or tubes.

In view of the fact that any of the analytical circuits, except the filament or heater circuits, numbered "3" and "4", may be broken by depressing the push button switches, 70, 71, 72, 75, and 76, it is possible to connect numerous other devices such as head-phones, loud speakers, phonograph pick-up devices, transformers, etc., for testing purposes. The possibility of varying the connections by the "switchboard" arrangement of the analyzer panel renders the tester disclosed herein capable of many uses for present needs as well as future ones.

It is understood that the expressions "direct currents" and "alternating currents" appearing in the specification and claims, are used in their generic sense and have reference to both voltage Having described my invention, I claim:—

1. In a portable radio testing apparatus, a single indicating meter for indicating thereon direct current voltages and currents, alternating current voltages, capacities, and resistance values, current elements comprising resistors and capacitors associated with said meter, and switching means for selecting said meter and appurtenant circuit elements for operation to effect said indications.

2. In a portable radio testing apparatus, a single instrument having a uniformly divided scale for indicating thereon a plurality of ranges of direct current voltages and currents, alternating current voltages, and capacities, circuit elements comprising resistors and capacitors associated with said instrument, and switching means for selecting said instrument and appurtenant circuit elements for operation to effect said indications.

3. In a portable radio testing apparatus, a single instrument having a uniformly divided scale for indicating thereon a plurality of ranges of direct current voltages and currents, alternating current voltages, and capacities and a second scale on said instrument calibrated in ohms, circuit elements comprising resistors and capacitors associated with said meter, and switching means for selecting said instrument and appurtenant circuit elements for operation to effect said indications.

4. In a testing apparatus, a direct current measuring instrument, a uniform scale on said instrument for indicating alternating current and direct current values thereon, a rectifier for rectifying alternating currents to be measured by said instrument, a condenser in series with said rectifier, the combined impedance of said series circuit bearing a definite relation to the resistance of the circuit containing said measuring instrument when direct currents are measured, corresponding to the form factor of the measured alternating currents.

5. In a testing apparatus, a direct current measuring instrument for indicating alternating current and direct current values thereon, a rectifier for rectifying alternating currents to be measured by said instrument, a condenser in series with said rectifier, a resistance in series with said instrument, switching means for connecting alternating current to be measured in circuit with said rectifier and condenser and direct current in circuit with said instrument and resistance, the impedance of said first-mentioned circuit being less than the resistance of said second circuit and bearing the ratio of the form factor of the alternating current whereby the average values of the impressed alternating current obtained at the output of said rectifier are indicated as root mean square values on the same point of the uniform scale as the average or effective values of direct current.

6. The combination claimed in claim 4 wherein the reactance of said condenser forms the principal portion of said impedance.

7. The combination claimed in claim 5 wherein the reactance of said condenser constitutes the principal portion of said impedance whereby variations in the indications arising from changes in the resistance of said rectifier are minimized.

8. A meter comprising a rectifier, a D'Arsonval galvanometer instrument for measuring the output of said rectifier, means for selectively connecting said instrument to said rectifier for measuring alternating currents and for disconnecting said instrument from said rectifier for measuring direct currents, impedance means formed, at least in part, of capacitive reactance in series with said rectifier upon the measuring of alternating currents for controlling the maximum deflection of the needle of said galvanometer instrument, resistance means comprising a resistance in series with said instrument upon the measuring of direct current, for controlling the maximum deflection of the needle thereof, said last-mentioned resistance means being greater than said impedance means corresponding to the form factor of the measured alternating currents whereby the effective value of both direct and alternating currents is indicated by equal deflections of the needle of the instrument.

9. A meter comprising a rectifier, a D'Arsonval galvanometer instrument for measuring the output of said rectifier, means for selectively connecting said instrument to said rectifier for measuring alternating current potentials and for disconnecting said instrument from said rectifier for measuring direct current potentials, impedance means formed, at least in part, of capacitive reactance in series with said rectifier upon the measuring of alternating current potentials for controlling the maximum deflection of the needle of said galvanometer instrument at the lowest range of operation of said meter, resistance means comprising a resistance in series with said instrument upon the measuring of direct current potentials, for controlling the maximum deflection of the needle thereof at the lowest range of operation of said meter, said last-mentioned resistance means being greater than said impedance means corresponding to the form factor of the measured alternating current potentials whereby the effective value of both direct and alternating currents is indicated by equal deflections of the needle of the instrument at the lowest range of operation of said meter, at least one multiplier resistance for increasing the range of said meter for indicating high direct current potentials, and a condenser in shunt with said multiplier resistor for decreasing the impedance thereof upon the measuring of alternating current potentials to compensate for the form factor thereof.

10. A meter comprising a rectifier, a D'Arsonval galvanometer instrument for measuring the output of said rectifier, means for selectively connecting said instrument to said rectifier for measuring alternating current potentials and for disconnecting said instrument from said rectifier for measuring direct current potentials, impedance means formed, at least in part, of capacitive reactance in series with said rectifier upon the measuring of alternating current potentials for controlling the maximum deflection of the needle of said galvanometer instrument at the lowest range of operation of said meter, resistance means comprising a resistance in series with said instrument upon the measuring of direct current potentials, for controlling the maximum deflection of the needle thereof at the lowest range of operation of said meter, said last-mentioned resistance means being greater than said impedance means corresponding to the form factor of the measured alternating current potentials whereby the effective value of both direct and alternating currents is indicated by equal deflections of the needle of the instrument at the lowest range of operation of said meter, a plurality of multiplier resistors for obtaining higher operating ranges of said meter for indicating higher direct current potentials, and condensers in shunt with said multiplier resistors for decreasing the impedance thereof upon the measuring of alternating current potentials to compensate for the form factor thereof.

11. A meter comprising a rectifier, a D'Arsonval galvanometer instrument for measuring the output of said rectifier, means for selectively connecting said instrument to said rectifier for measuring alternating current potentials and for disconnecting said instrument from said rectifier for measuring direct current potentials, impedance means formed primarily by a preponderance of capacitive reactance in series with said rectifier upon the measuring of alternating current potentials for controlling the maximum deflection of the needle of said galvanometer instrument at the lowest range of operation of said meter, resistance means comprising a resistance in series with said instrument upon the measuring of direct current potentials, for controlling the maximum deflection of the needle thereof at the lowest range of operation of said meter, said last-mentioned resistance means being greater than said impedance means corresponding to the form factor of the measured alternating current potentials whereby the effective value of both direct and alternating currents is indicated by equal deflections of the needle of the instrument.

12. In a portable testing apparatus, an indicating meter, a socket in said apparatus for receiving a tube having a plurality of electrodes comprising an electron emitting cathode, a grid and a plate, a plurality of tube terminals associated with said socket, a set of terminals in said apparatus connected to said tube terminals, a second set of terminals corresponding to the last-mentioned terminals, a plurality of conductors extending from said last-mentioned terminals, an analyzing plug having prongs adapted to fit into the tube socket in a radio apparatus, said prongs being connected to the ends of said conductors, connections in said testing apparatus between corresponding terminals of said two sets of terminals, and switch means associated with said connections to break said normally closed connections to insert said indicating meter in a lead between a prong in the analyzing plug and a terminal of the tube socket in said testing apparatus.

13. In a portable testing apparatus, an indicating meter, a plurality of meter terminals, comprising a common terminal, in said apparatus for connecting said meter for operation for a plurality of ranges, a socket in said apparatus for receiving a tube having a plurality of electrodes comprising an electron emitting cathode, a grid and a plate, a plurality of tube terminals associated with said socket, a set of terminals in said apparatus connected to said tube terminals, a second set of terminals corresponding to the last-mentioned terminals, a plurality of conductors extending from said last-mentioned terminals, an analyzing plug having prongs adapted to fit into the tube socket in a radio apparatus, said prongs being connected to the ends of said conductors, connections in said testing apparatus between corresponding terminals of said two sets of terminals, a detachable conductor for connecting one terminal of one of said sets of terminals with the common meter terminal, a second detachable conductor for connecting the terminal of the second set corresponding to said last-mentioned terminal to one of the other meter terminals, and switch means associated with said connections to break said normally closed connections and to insert said indicating meter through said detachable conductors in a lead between a prong in the analyzing plug and a terminal of the tube socket in said testing apparatus.

14. In a portable testing apparatus, an indicating meter, terminals for said meter, a self-contained battery in said apparatus, terminals for the poles of said battery, a socket in said apparatus for receiving a tube having a plurality of electrodes comprising an electron emitting cathode, a control grid, and a plate, a plurality of tube terminals associated with said socket, a set of terminals in said apparatus connected to said tube terminals, a second set of terminals corresponding to said last-mentioned terminals, a plurality of conductors extending from said last-mentioned terminals, an analyzing plug having prongs adapted to fit into the tube socket in a radio apparatus, said prongs being connected to the ends of said conductors, connections in said testing apparatus between corresponding terminals of said two sets of terminals, detachable conductors connected between the battery terminals and to the terminal of each set corresponding to the control grid of the tube, detachable conductors connected between the meter terminals and the terminal of each set corresponding to the plate of the tube, and switch means associated with said connections to break said normally closed connections to insert said battery in the lead from the prong in the analyzing plug corresponding to the grid and to insert said meter in the lead from the plate to note the effect of a different potential on the grid of the tube upon the plate current.

15. In a portable testing apparatus, an indicating meter, a battery, a socket in said apparatus for receiving a tube having a plurality of electrodes, a plurality of tube terminals associated with said socket adapted to make electrical connection with the electrodes of the tube, a set of terminals in said apparatus connected to a plurality of said tube terminals, a second set of terminals corresponding to said last-mentioned terminals normally conductively connected with the respective terminals of the first set, a plurality of conductors extending from said second set of terminals, an analyzing plug having connectors adapted to make electrical contact with the terminals associated with a tube socket in a radio apparatus, said connectors being joined to the ends of said conductors, means operatively associated with said conductively connected sets of terminals to break said normal conductive connection between one pair of terminals of the respective sets and to insert said battery in a lead between a connector in said analyzing plug and a tube terminal of the tube socket in said testing apparatus, and a second means operatively associated with said conductively connected sets of terminals to break said normal conductive connection between a second pair of terminals of the respective sets and to insert said indicating meter in another lead between another connector in said analyzing plug and another tube terminal of the tube socket in said testing apparatus for indicating the change effected by the insertion of said battery.

16. In a portable testing apparatus, an indicating meter, a battery, a socket in said apparatus for receiving a tube having a plurality of electrodes, a plurality of tube terminals associated with said socket adapted to make electrical connection with the electrodes of the tube, a set of terminals in said apparatus connected to a plurality of said tube terminals, a second set of terminals corresponding to said last-mentioned terminals normally conductively connected with the respective terminals of the first set, a plurality of conductors extending from said second set of terminals, an analyzing plug having connectors adapted to make electrical contact with the terminals associated with a tube socket in a radio apparatus, said connectors being joined to the ends of said conductors, switch means operatively associated with said conductively connected sets of terminals to interrupt selectively said normal conductive connection between one pair of terminals of the respective sets and simultaneously to insert said battery in a lead between a connector in said analyzing plug and a tube terminal of the tube socket in said testing apparatus, and a second switch means operatively associated with said conductively connected sets of terminals to interrupt selectively said normal conductive connection between a second pair of terminals of the respective sets and simultaneously to insert said indicating meter in another lead between another connector in said analyzing plug and another tube terminal of the tube socket in said testing apparatus for indicating the change effected by the insertion of said battery.

17. In a metering circuit, a rectifier, a D'Arsonval galvanometer for measuring the output of said rectifier, means for selectively connecting said galvanometer to the output of said rectifier for measuring alternating currents applied to the input of said rectifier and for connecting said instrument directly with a direct current circuit for measuring direct currents, a condenser in series with said rectifier, the combined impedance of said series circuit bearing a definite relation to the resistance of the measuring circuit when direct currents are measured, corresponding to the form factor of the measured alternating currents.

FLOYD FAUSETT.